United States Patent [19]

Dyfverman

[11] Patent Number: 4,466,714

[45] Date of Patent: Aug. 21, 1984

[54] APPARATUS FOR LISTING CINEMATOGRAPHIC FILM

[76] Inventor: Tomas Dyfverman, Vasavägen 8, S-171 39 Solna, Sweden

[21] Appl. No.: 365,982

[22] Filed: Apr. 6, 1982

[30] Foreign Application Priority Data

Apr. 14, 1981 [SE] Sweden ............................ 8102410

[51] Int. Cl.³ ........................................ G03B 21/00

[52] U.S. Cl. ........................................ 352/129; 352/5

[58] Field of Search ............................ 352/5, 129

[56] References Cited

U.S. PATENT DOCUMENTS

| | | | |
|---|---|---|---|
| 3,376,093 | 4/1968 | Freudenschuss | 352/5 |
| 4,141,629 | 2/1979 | Mattes | 352/5 |
| 4,368,961 | 1/1983 | Mattes | 352/5 |

*Primary Examiner*—Monroe H. Hayes

*Attorney, Agent, or Firm*—Browdy and Neimark

[57] ABSTRACT

An apparatus for listing cinematographic film comprises means (1, 2, 3, 4, 6, 7) for reversible feeding of film past an index position and for generating electric signals representing each picture frame fed past the index position and the direction in which the film is fed. A counter (8) driven by said electric signals is arranged to count the net number of picture frames fed past the index position in a given direction. Means (9, 19) are also provided for visually displaying to an operator an enlarged form of the film section located at the index position. A data processor (11) provided with a data input keyboard (12) is connected to the counter and arranged to calculate positional information concerning desired picture frames in the film, on the basis of data entered into the processor through the keyboard and the content of the counter, and to store this positional information in a data storage.

7 Claims, 1 Drawing Figure

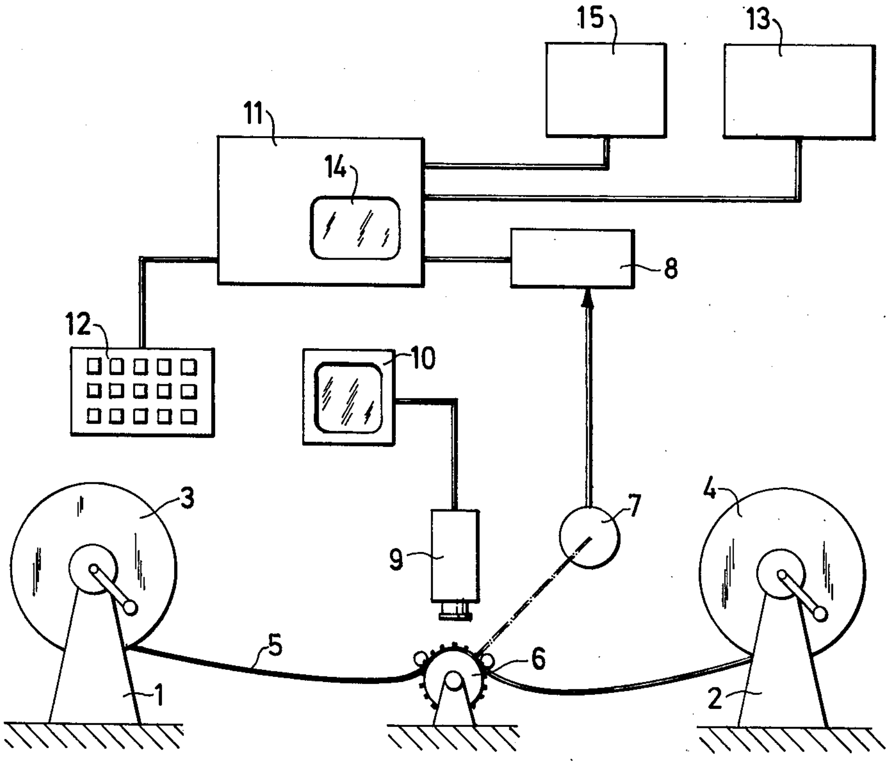
15
13
11
14
8
12
10
3
4
7
9
5
6
1
2

APPARATUS FOR LISTING CINEMATOGRAPHIC FILM

The present invention relates to apparatus for so-called listing of cinematographic film.

By "listing" is meant a procedure in the processing and editing of cinematographic film material, in which positional information concerning given frames of interest in the film are recorded by the aid of numbers located on the edge or margin of the film. Cinematographic or motion picture film material is provided on the edge thereof with regularly occurring, consecutive numbers, so-called edge numbers or key numbers, by means of which it is possible to indicate clearly the position of each separate picture frame, by giving an adjacent edge number and the number of frames between said edge number and the frame in question, whereat it is possible to proceed either from the nearest preceding edge number and to count the number of so-called plus frames up to the frame in question, or from the nearest following edge number and count the number of so-called minus frames up to the frame in question. The number of frames between mutually sequential edge numbers is always the same for a given film material, but may vary with different film materials. This listing process is primarily carried out on the edited work print, which comprises a large number of mutually sequential and mutually spliced scenes of different lengths obtained from different locations in the original film material. The purpose in this respect is to record the positional information, i.e. edge numbers and the number of plus frames or minus frames, for the first frame and the last frame of each separate scene, so that these scenes can be found in the original film material, which is often many times greater in volume or length than the material actually used in the finally edited work print, and it becomes possible to edit the original film material so as to obtain a copy thereof which confirms exactly with the edited work copy, the so-called conforming process. A similar listing process, however, can also be found in other contexts.

Listing processes of the aforedescribed kind have hitherto been carried out practically totally manually, by feeding the film between two film spools over a ground glass viewing screen which is illuminated from beneath and with which those picture frames of interest can be found, with the aid of a magnifier. The frames of interest are usually the first and the last frames in each scene, and with the guidance of the edge numbers located nearest said frames and by counting the number of intermediate frames positional information for each frame of interest is calculated in the form of an edge number and a plurality of plus frames or minus frames for each frame of interest, this positional information is recorded in a list. For determining the number of intermediate frames between a frame of interest and the adjacent edge number one uses generally in this listing work a ruler graduated in picture frames and along which the film is placed.

As will be readily understood, such listing work is strenuous and time consuming, and is encumbered with a relatively high error risk. Due to the very large number of scenes in a film, which can often be, for example, in the order of magnitude of 10 for each minute of film, it is practically impossible to avoid at least one or more errors during the listing process, even when said process is carried out by a highly experienced and skilled person.

Those skilled in this art are extremely conscious of this fact, and hence the editing of the original film material, hereinafter referred to as the conforming, into exact conformity with the edited work print is not carried out solely on the basis of the listing. Instead, the listing is only used to enable the various scenes to be more readily taken from the comprehensive original material, while the actual conforming process is carried out while constantly comparing with the edited work print in a so-called synchronizer, so as to ensure that the conforming is carried out in exact agreement with the cuts or scene transitions in the edited work print. This causes the conforming process to be relatively time consuming and, in addition, that the edited work print is not accessible to the director/producer over the whole period taken for the listing, the comforming and the checking of the final conformed film copy. This is considered a serious drawback. The consequences of this drawback can be so serious as to force the producer to make an extra work print of the finally edited work print, incurring considerable extra costs.

During the comforming process it is often desirable to take short, so-called colour sample strips from the film, immediately before or after each scene actually used. It is not clear from the listing, however, where such colour sample strips can be safely cut out, since they cannot, of course, be taken from material which is to be actually used in a later scene.

Further, it is often discovered during the conforming process that the film editor has forgotten, when editing the work print, to leave the necessary splicing margin at each cut or transition between sucessive scenes. When editing the work print there is namely employed a splicing technique in which no picture frames are lost, while in the conforming process there is used a splicing technique which requires more frames of each scene that are included in the work print. This is also difficult to discover when employing hitherto known listing modes, and is not normally discovered until carrying out the conforming process, where this lack of necessary splicing margins gives rise to difficult problems.

The finally edited work print will also normally contain a relatively large number of so-called unintentional splices, which shall not be considered during the conforming process and which must be colour-marked on the work print by the editor so that these unintentional splices are not included in the listing process. If the editor forgets to do this, as sometimes happens, the unintentional splices are also listed, which can cause trouble during the subsequent conforming process.

Consequently, the object of the present invention is to provide apparatus for listing cinematographic film which: greatly facilitates and expedites the actual listing work, enables listing to be effected in such a precise and faultless manner that the conforming process can be carried out solely on the basis on said listing without requiring simultaneous access to the edited work print;

enabling it to be ascertained in conjunction with the listing process whether insufficient splicing margins are allowed for in the edited work print, and if so at which locations;

enabling it to be established already in conjunction with the listing process, where colour sample strips can safely be taken, and also to enable unintentional splices not colour-marked by the editor to be discovered during said listing process.

The apparatus according to the invention has the characterizing features set forth in the following claims.

The invention and advantages afforded thereby will now be described in detail with references to the accompanying drawing, the single FIGURE of which illustrates an exemplary embodiment of an apparatus according to the invention.

The illustrated apparatus according to the invention comprises two spool arms 1 and 2 on which film spools 3 and 4 can be mounted, so as to enable a film 5 to be fed backwards and forwards between the two spools, by means of a sprocket wheel 6 mounted between the spool arms and provided with film-holder means and position indicator. Connected to the sprocket wheel 6 is an electric pulse generator 7, arranged to generate a signal pulse for each picture frame fed past the index position at the sprocket wheel and simultaneously to indicate the direction in which the film is being fed at that time. The signals from the pulse generator 7 are transferred to a reversible pulse counter 8, in which the pulses supplied thereto are counted while taking the feed direction of the film into account, such that the content or count in the counter 8 gives the net number of picture frames fed past the index position of the sprocket wheel 6 in a predetermined direction, for example from left to right.

The apparatus also includes means for visually displaying to the operator in an enlarged scale that section of the film located at the index position of the sprocket wheel 6. In the illustrated embodiment, said means includes a small TV-camera 9 with associated monitor 10. Although not shown in detail; means are also provided for illuminating the aforementioned section of said film. Instead of a TV-camera with associated monitor there can be used a purely optical viewing means, for example means similar to an industrial profile projector or a projection microscope with suitable amplification.

The illustrated apparatus also includes a data processing unit 11 having an associated keyboard 12 for feeding data and working instructions to said data processor, a printer 15 and a recording unit 13 for recording the listing information produced in the data process 11 on some other suitable data carrier, for example a floppy disc, a magnetic tape, a punch tape or like recording media. The data processor 11 is suitably provided with a display screen 14 in a conventional manner, for presentation of data and instructions fed into the data processor by means of the keyboard 12. The counter 8 is connected to the data processor 11 in a manner such as to provide access for the processor to the content of the counter. Alternatively, the counter 8 may form an integral part of the data processor 11. The monitor 10 and the display screen 14 of the data processor are suitably arranged close to one another, and may optionally be combined to form a unit, thereby facilitating the work of the operator.

Listing is effected with the aid of said listing apparatus in the following manner:

(1) The first picture frame in the first scene on the film is advanced to the index position adjacent the sprocket wheel 6; this can readily be effected by the operator, using the image on the monitor 10 as a guide.

(2) The counter 8 is set to a given start number, is "zeroised", and this number is fed into the data processor 11 by means of the keyboard 12 as being representative of the first frame of the first scene.

(3) The film is advanced by the sprocket wheel 6 until the first edge number in the first scene is located at the index position, which can be seen on the monitor 10. The operator reads-off the edge number on the monitor 10 and feeds said number into the data processor by means of the keyboard 12, and by depressing an instruction key on the keyboard 12 instructs the data processor 11 to calculate positional information, i.e. the edge number and the number of plus frames, or minus frames if so preferred, concerning the first frame in the first scene, using said edge number and the current count in the counter 8 as a guide. It will be understood that the data processor can readily carry out this calculation, since information concerning the spacing, i.e. the number of frames, between consecutive edge numbers on the film has been entered through the keyboard 12 into the data processor right from the very beginning. The positional information concerning the first frame in the first scene is stored in the memory of the data processor.

(4) The film is then advanced further until the last frame in the first scene is located at the index position of the sprocket wheel 6. The instruction key on the keyboard 12 is then depressed, to again instruct the data processor 11 to calculate positional information, i.e. the edge number and the number of plus or minus frames, relating to this last frame in the first scene, on the basis of the current count in the counter 8 and the edge number within the first scene previously fed into the processor. The processor 11 then stores this positional information in its memory, as belonging to the last frame in the first scene.

Advantageously, as an additional procedural step between the aforedescribed steps (3) and (4) the film may be advanced to a position in which an edge number in the first scene different to the first edge number is located at the index position of the sprocket wheel 6, for example the last edge number in the first scene, whereafter this edge number visible on the monitor 10 is fed into the data processor 11 through the keyboard 12 and the processor 11 is instructed to compare this edge number with an edge number as calculated by the data processor on the basis of the then current count in the counter 8 and the first edge number fed into said processor from the first scene. If there is no agreement when making this comparison, the operator must have made an error when feeding in one of the edge numbers, and the data processor 11 is able to indicate this on the screen 14, so that the operatoris immediately able to re-list this scene. If, on the other hand, the comparison does result in agreement, it is highly probable that the edge-number values fed into the processor are correct. It will be understood that the data processor 11 can readily carry out this check on the basis of the expression $$(F_2-F_1)K=R_2-R_1,$$

where $F_1$ and $F_2$ are two mutually different edge numbers fed into the processor from the same scene, $R_1$ and $R_2$ are the corresponding counts of the counter 8, and K is the number of picture frames between consecutive edge numbers.

Subsequent to listing the first scene in the film, in the aforedescribed manner, listing of the next scene, the second scene, is effected by repeating the aforedescribed procedural steps (3) and (4), while advantageously including the aforementioned intermediate comparison step. As will be understood, it is not necessary to repeat steps 1 and 2, since the first frame of a scene will always be located one frame behind the last frame of the preceding scene.

If the length of a particular scene is so short that it contains no edge number, the work print is followed by a notation made by the editor concerning positional information, i.e. edge number and the number of plus or minus frames, for a given picture frame, for example the first frame, of the scene, this information being fed into the data processor 11 by the listing technician through the keyboard 12.

Subsequent to working through the whole film in the aforedescribed manner, the data processor 11 can be instructed to print, by means of the printer 15, a list of positional information relating to the first and second frames of all scenes, or to register this information on a suitable data carrier through the recording unit 13. This printed list or data carrier can then be used in the conforming of the original material.

It will be readily seen from the aforegoing that the listing work is much easier and can be effected much more rapidly than when employing the previously known manual method, and that said listing can be expected, with a high degree of assuredness, to be exact and faultless, so as to enable said listing to be used as the sole basis for the conforming process without requiring simultaneous access to the work print.

It will be understood that the data processor 11 can readily be programmed to discover whether or not the splicing margins in the work print are insufficient or not, and to raise the alarm when insufficient margins are afforded, and also to show where colour sample strips can safely be taken.

It will also be readily understood that the data processor can readily be programmed to give an alarm should the listing technician attempt to list an unintentional splice in the work print.

The data processor can also be programmed to provide information, upon completion of the listing operation, as to which sections of the original material possibly occur in more than one scene, so that it is possible to order immediately further copies of these sections for use in the subsequent conforming operation.

If the listed work print is to be used as a basis for a conforming or original material in video-tape form, which is provided with a consecutive time code instead of edge numbers, the data processor 11 can be readily programmed to include in the listing result also, or possibly solely, the time-code of the video tape material for the first and the last frame in each scene, by providing the data processor 11, prior to commencing the listing operation, with information concerning the corresponding time code in the video-tape material for a given edge number in each roll of the film material. In this way, the data processor can readily translate positional locations in the form of edge numbers and number of plus or minus frames for each picture frame of interest in the film material to the time codes of the same frames in the video-tape material.

The data processor 11 can also be used for many other working purposes, such as to punch a punch tape with information concerning the position of each scene transition or cut in the work print, expressed in the number of frames from the beginning of the film or a preceding scene. Such a punch tape is used in many cases in film laboratories for controlling light-colour-changes in the machines used for copying to film or video tape.

I claim:

1. An apparatus for listing cinematographic film, comprising means for reversibly feeding the film past an index position;

means connected to said film feeding means for generating electric signals representing each picture frame fed past said index position and the direction in which the film is being fed;

counting means responsive to said electric signals for counting the net number of picture frames fed past said index position in a given direction;

means for visually displaying to an operator an enlarged form of the film section located at the index position at any moment; and data processing means connected to said counting means and provided with data and instruction input means in the form of a keyboard, said keyboard comprising a reset key activatable for resetting said counting means to a given initial count value, alphanumeric keys activateable for entering into the data processing means edge numbers provided on the film and appearing on said visual display means when located at said index position, and at least one calculate-and-store key activatable for instructing the data processing means to perform a calculating and storing process, said data processing mens being operable in response to an activation of said calculate-and-store key to calculate, on the basis of the current count value in said counting means and the edge number last entered into the data processing means, a positional information alternatingly for the picture frame currently located at said index position at the activation of said calcualte-and store-key and for the picture frame following immediately after the picture frame located at said index position at the last preceding activation of said calculate-and-store key, said positional information being expressed in the edge number most adjacent to the frame concerned and the number of picture frames in between, and to store said calculated positional information in a data storage.

2. An apparatus as claimed in claim 1, wherein said keyboard comprises a calculate-and-compare key activatable for instructing the data processing means to perform a calculating and comparing process, said data processing means being operable, in response to an activation of said calculate-and-compare key, to calculate, on the basis of the current count value in said counting means and the edge number last entered into the data processing means, the edge number for the picture frame currently located at said index position at the activation of said calculate-and compare key, and to compare said calculated edge number with an edge number for said picture frame entered into the data processing means in conjunction with the activation of said calculate-and-compare key and to indicate the result of said comparison in terms of an agreement or disagreement.

3. An apparatus as claimed in claim 1, wherein said data processing means are operatable to translate said calculated positional information, expressed in edge numbers and numbers of intermediate picture frames, into a different format expressing said calculated positional information in a time code provided on a video tape which contains exactly the same pictures as said film.

4. An apparatus as claimed in claim 1, comprising means connected to said data processing means for recording said calculated positional information concerning desired picture frames on a data carrier.

5. An apparatus as claimed in claim 1, comprising means connected to said data processing means for alphanumerically printing said calculated positional information concerning desired picture frames.

6. An apparatus as claimed in claim 1, wherein said means for visually displaying the film section located at said index position include a TV-camera and an associated monitor.

7. An apparatus as claimed in claim 1, comprising a display screen connected to said data processing means for visually displaying data and instructions entered into said data processing means.

* * * * *